United States Patent
Yue et al.

(10) Patent No.: US 11,790,640 B1
(45) Date of Patent: Oct. 17, 2023

(54) METHOD FOR DETECTING DENSELY OCCLUDED FISH BASED ON YOLOV5 NETWORK

(71) Applicant: Ludong University, Yantai (CN)

(72) Inventors: Jun Yue, Yantai (CN); Cheng Dong, Yantai (CN); Zhenbo Li, Beijing (CN); Jun Zhang, Yantai (CN); Guangjie Kou, Yantai (CN); Shixiang Jia, Yantai (CN); Ning Li, Yantai (CN); Hao Sun, Yantai (CN)

(73) Assignee: Ludong University, Yantai (CN)

( * ) Notice: Subject to any disclaimer, the term of this patent is extended or adjusted under 35 U.S.C. 154(b) by 0 days.

(21) Appl. No.: 18/184,529

(22) Filed: Mar. 15, 2023

(30) Foreign Application Priority Data

Jun. 22, 2022 (CN) .......................... 202210709818.5

(51) Int. Cl.
    *G06V 10/80*     (2022.01)
    *G06N 3/04*     (2023.01)
    *G06V 10/20*     (2022.01)

(52) U.S. Cl.
    CPC .......... *G06V 10/806* (2022.01); *G06V 10/255* (2022.01)

(58) Field of Classification Search
None
See application file for complete search history.

(56) References Cited

U.S. PATENT DOCUMENTS 11,694,428 B1 * 7/2023 Yue ........................ G06V 40/10
    382/103

FOREIGN PATENT DOCUMENTS

| CN | 109325504 A | 2/2019 | |
| CN | 109523520 A | 3/2019 | |
| CN | 110866476 A | * 3/2020 | ............. G06V 20/10 |
| CN | 110866476 A | 3/2020 | |
| CN | 111062335 A | 4/2020 | |
| CN | 111209952 A | 5/2020 | |
| CN | 111310622 A | 6/2020 | |
| CN | 113076871 A | 7/2021 | |
| CN | 113743470 A | 12/2021 | |
| CN | 114140665 A | * 3/2022 | ............. G06N 3/08 |
| CN | 114170497 A | 3/2022 | |
| CN | 114202563 A | 3/2022 | |
| CN | 114419320 A | 4/2022 | |
| WO | 2020157862 A1 | 8/2020 | |

OTHER PUBLICATIONS

Li et al, CME-YOLOV5 An Efficient Object Detection Networks for Densely Space Fish and Small Targets, Water 2022, 14, 2412. http://doi.org/10.3390/w14152412, pp. 1-12, (Year: 2022).*

(Continued)

*Primary Examiner* — Ishrat I Sherali
(74) *Attorney, Agent, or Firm* — Westbridge IP LLC

(57) ABSTRACT

Disclosed is a method for detecting densely occluded fish based on a YOLOv5 network, belonging to the technical field of fish images. The method includes a data set establishment and processing part, a model training part and a model testing part; the data set establishment and processing part includes data collection of fish pictures, data labelling and data division of the fish pictures; and the data division is to divide data into a training set, a verification set and a test set.

6 Claims, 3 Drawing Sheets

(56) References Cited

OTHER PUBLICATIONS

Liu et al., Multi-class fish stock statistics technology based on object classification and tracking algorithm, ScienceDirect, Ecological Informatics, vol. 63, Jul. 2021, pp. 1-17. (Year: 2021).*

Xing et al., Image-enhanced YOLOv5 and Deep Sort Underwater Multi-moving Target Tracking Method, 2022 IEEE 9778-1-6654-8708-5/22, pp. 1-6. (Year: 2022).*

First Office Action issued in counterpart Chinese Patent Application No. 202210709818.5, dated Aug. 1, 2022.

Li, Surface defect detection algorithm for tee pipe based on deep learning, Master Thesis submitted to Zhejiang University, dated Mar. 2, 2022.

Yang, Study of Hunger Behavior of The Opleganthus Based on Video Computing, Master Thesis submitted to Ludong University, dated May 25, 2022.

First Office Action issued in counterpart Chinese Patent Application No. 202210796234.6, dated Aug. 12, 2022.

Zhang et al., Fish School Counting Method Based on Multi-scale Fusion and No Anchor YOLO v3, Transactions of the Chinese Society for Agricultural Machinery, vol. 52, pp. 237-244, dated Nov. 30, 2021.

Zhang et al., Yolov4 High-Speed Train Wheelset Tread Defect Detection System Based on Multiscale Feature Fusion, Journal of Advanced Transportation, vol. 2022, Article ID 1172654, dated Mar. 27, 2022.

\* cited by examiner

METHOD FOR DETECTING DENSELY OCCLUDED FISH BASED ON YOLOV5 NETWORK

CROSS-REFERENCE TO RELATED APPLICATIONS

This application claims priority to Chinese Patent Application No. 202210709818.5, filed on Jun. 22, 2022, the contents of which are hereby incorporated by reference.

TECHNICAL FIELD

The application relates to a method for detecting densely occluded fish based on a YOLOv5 network, belonging to the technical field of fish images.

BACKGROUND

In a process of aquaculture, detection of fish is a premise to estimate a length, a quantity and a density of the fish. Using a computer vision technology to detect and count fish may cut down investment in manpower and therefore save cost of breeding. In the process of fish detection by the computer vision technology, there is usually a serious occlusion when the fish density is high, thus bringing challenges to the fish detection. A mutual occlusion between the fish makes detection information of the fish incomplete, so a detection is increasingly difficulty. Moreover, it is easy for a detection algorithm to detect the occluded fish, and it is easy to miss detection. Existing fish detection methods may not effectively deal with a dense occlusion of the fish, and may have a low accuracy and a slow detection speed when detecting densely occluded fish, so the methods may not be effectively applied in embedded devices. For example, it is known that a You Only Look Once 5 (YOLOv5) method is used to detect the fish in an occluded environment. Because of the serious occlusion caused by the fish gathered together, the fish gathered and occluded together may be identified as individual fish when using the YOLOv5 method to detect the fish, thus leading to a large number of fish being missed and the low accuracy of the fish detection.

SUMMARY

In order to improve an ability of a You Only Look Once 5 (YOLOv5) network to detect dense fish, a method for detecting densely occluded fish based on a YOLOv5 network is provided.

The application solves the above technical problems through following technical schemes:

the method for detecting the densely occluded fish based on the YOLOv5 network includes a data set establishment and processing part, a model training part and a model testing part; the data set establishment and processing part includes data collection of fish pictures, data labeling and data division of the fish pictures; the data division is to divide data into a training set, a verification set and a test set, and the training set and the verification set are used to train and verify a model in a neural network of the model training part; the method is characterized in that the model training part calculates a model training budget result output by the model by using a loss function, judges an error between the training budget result and a real labeling result, and updates parameters in the neural network of the model to improve an accuracy of the model; the loss function is an improved loss function, and an improved repulsion loss function is introduced into the loss function to enhance the ability of the model to detect mutually occluded fish; in the application, common modules in the YOLOv5 network, such as a Focus module, a CBS module, a SPP module, a C3_1x module and a C3_3x module are also used.

The improved repulsion loss function is $L_{RepGT}$, and $\text{Smooth}_{In}$ and $\text{Smooth}_{L1}$ functions used in the $L_{RepGT}$ function make prediction boxes of different fishes repel each other, so as to achieve an effect of being far away from each other and reduce an overlap degree between the prediction boxes, thereby reducing a number of fish missed detection and improving a detection accuracy.

The improved repulsion loss function is as follows:

$$L_{RepGT} = \frac{\lambda_1 * \sum_{P \in \mathcal{P}_+} \text{Smooth}_{In} IoG(B^P, G_{Rep}^P) + \lambda_2 * \sum_{P \in \mathcal{P}_+} \text{Smooth}_{L1} IoG(B^P, G_{Rep}^P)}{|\mathcal{P}_+|},$$

where $\lambda_1$ and $\lambda_2$ are weight values of each function, and $\mathcal{P}_+ = \{P\}$ represents the set of all positive samples in a picture; $B^P$ represents the prediction box, $G_{Rep}^P$ represents the prediction box $B^P$ and truth boxes of other targets that have the greatest intersection over union with $B^P$ except the truth box corresponding to $B^P$.

After calculating the error of the model prediction result by using the loss function, updating the parameters in the neural network, and improving the accuracy of the model, the model is saved and loaded into the model in the model testing part for processing images and outputting the prediction result; the loss function is the improved loss function, and in a training process, the improved repulsion loss function is introduced into the loss function to enhance the ability of the model to detect the densely occluded fish; the repulsion loss function is $L_{RepGT}$, and the Smooths function used in the $L_{RepGT}$ function makes the prediction boxes of different fishes repel each other, so as to achieve the effect of being far away from each other and reduce the overlap degree between the prediction boxes, thereby reducing the number of fish missed detection and improving the detection accuracy. Rejection of $\text{Smooth}_{In}$ to the fish prediction boxes is not high enough when the overlap degree of the fish prediction boxes is small. The method described in this application continues to improve the $L_{RepGT}$ function and introduce the $\text{Smooth}_{L1}$ function, so that the fish prediction boxes may have a good rejection effect even when the overlap degree is small.

On a basis of the above technical scheme, following improvements are made:

further, the $G_{Rep}^P$, $$G_{Rep}^P = \underset{G \in \mathcal{G} \setminus \{G_{Attr}^P\}}{\text{argmax}}\ IoU(G, P),$$

where $G_{Attr}^P = \text{argmax}_{G \in \mathcal{G}} IoU(G, P)$, $\mathcal{G} = \{G\}$ represents the set of all the truth boxes in the picture; expressions of $\text{Smooth}_{In}(\ )$ $\text{Smooth}_{L1}(\ )$ and $IoG_(\ )$ are as follows, where $\sigma \in [0,1]$:

$$\text{Smooth}_{ln}(x) = \begin{cases} -\ln(1-x) & x \leq \sigma \\ \dfrac{x-\sigma}{1-\sigma} - \ln(1-\sigma) & x > \sigma \end{cases},$$

$$\text{Smooth}_{L1}(x) = \begin{cases} 0.5x^2, & |x| < 1 \\ |x| - 0.5, & \text{Other} \end{cases}, \text{ and}$$

$$IoG(B^P, G^P_{Rep}) \triangleq \dfrac{\text{area}(B^P \cap G^P_{Rep})}{\text{area}(G^P_{Rep})}.$$

In an embodiment, the model training part includes obtaining the prediction results after data enhancement, image scaling and modeling; the model includes a backbone network, a feature pyramid and detection.

Picture data is input into the backbone network of the model;

1) firstly, the data is input, and the features in the picture are preliminarily extracted after the data sequentially passes through a Focus module, a C3_1x module, a CBS module and a C3_3x module, and a feature matrix extracted at this time is saved and recorded as feature A1;

2) the feature A1 continues to be transmitted downwards, sequentially passes through the CBS module and C3_3x module to further extract the features, and a feature matrix extracted at this time is saved and recorded as feature A2; and 3) the feature A2 continues to be transmitted downwards, sequentially passes through the CBS module, the SPP module and the C3_3x module to extract the features, and a feature matrix extracted at this time is saved and recorded as feature A3.

In an embodiment, the features A1, A2 and A3 are all input into the feature pyramid, and in the feature pyramid, 1) firstly, the feature A3 is input into the CBS module to further extract the features, and an extracted feature matrix is saved and denoted as feature B1;

2) after the feature B1 is up-sampled, the feature B1 is input into a splicing module together with the previously stored feature A2 to be merged into one feature matrix, and then the merged feature matrix is sequentially input into the C3_1x module and the CBS module to further extract the features, and an extracted feature matrix is saved and recorded as feature B2;

3) the feature B2 is input into an up-sampling module for an up-sampling operation, and then is input into the splicing module together with the previously stored feature A1 to be merged into one feature matrix, and then the merged feature matrix is input into the C3_1x module to further extract the features, and an extracted feature matrix is saved and recorded as feature B3;

4) after the feature B3 is continuously input into the CBS module for feature extraction, the feature B3 is transported to the splicing module together with the previously stored feature B2 to be merged into one feature matrix, and then the merged feature matrix is input into the C3_1x module for further feature extraction, and an output feature matrix is saved and recorded as feature B4; and 5) after the feature B4 continues to flow through the CBS module, the feature B4 is input into the splicing module together with the previously stored feature matrix B1 to be merged into one feature matrix, and then the merged feature matrix is input into the C3_1x module for the further feature extraction, and an output feature matrix is saved and recorded as feature B5.

In an embodiment, the extracted feature matrices B3, B4 and B5 are respectively input into the three Cony (convolution) layers of a detection module, so as to identify and detect positions of fish objects in the pictures, and the final prediction result is output in a form of data matrix.

In an embodiment, the picture data in the data set establishment and processing part is obtained by following ways: collecting the fish pictures under mutual occlusion, and then manually labeling the data set with the LabelImg labeling tool, and converting the labeled data set into a COCO data set format; saving fish labeling boxes in a form of upper left corner coordinates and lower right corner coordinates of the fish labeling boxes after labeling the pictures by the LabelImg, and the form of each labeling box in the COCO data set is coordinates of each center point of each labeling box and a width and a height of each labeling box; dividing the coordinates of each center point and the width and the height of each labeling box by the width and the height of each picture, limiting a range of coordinate values to 0-1, and then saving these coordinate values into a txt text document.

In an embodiment, the data in the training set is expanded by changing brightness, contrast and saturation of the fish pictures, and then the data is input into a neural network model used by the YOLOv5 network for training; when the model is trained, a mosaic method is used as an algorithm to enhance the data; four pictures selected in the training set are scaled and cropped respectively, and a scaled picture size is 0.5 to 1.5 times of an original picture size, and a cropped range is a cropping of ⅒ of a left side or a right side of one picture; and then these four pictures are placed in an order of an upper left corner, an upper right corner, a lower left corner and a lower right corner, and these four pictures are spliced into one picture, and these four pictures are input into the network as one picture for training, and the picture size is scaled to 640×640.

In an embodiment, in the detection, the algorithm predicts the input picture on three different scales preset manually in advance: 20×20, 40×40 and 80×80, and presets three anchor boxes, which are recorded as Y1, Y2 and Y3, with different sizes on each feature map of each scale, so as to better detect objects with different sizes and shapes in the picture; after the detection, the prediction results on three different scales are output; and the prediction results include a category, a confidence and the coordinates of the target in the picture.

The technical scheme of this application has following beneficial effects.

The loss function of YOLOv5 is improved to improve the accuracy of the fish detection and reduce the fish missed detection. Specifically, the repulsion loss function: $L_{RepGT}$, that may be used to deal with the occlusion situation, is introduced, and the $\text{Smooth}_{ln}$ function used in the $L_{RepGT}$ function makes the prediction boxes of different fishes repel each other, so as to achieve the effect of being far away from each other and reduce the overlap degree between the prediction boxes, thereby reducing the number of fish missed detection and improving the detection accuracy. The rejection of $\text{Smooth}_{ln}$ to the fish prediction boxes is not high enough when the overlap degree of the fish prediction boxes is small. The method described in this application continues to improve the $L_{RepGT}$ function and introduce the $\text{Smooth}_{L1}$ function, so that the fish prediction boxes may have the good rejection effect even when the overlap degree is small. In addition, two weight parameters $\lambda_1$ and $\lambda_2$ are introduced to adjust proportions of two functions of $\text{Smooth}_{ln}$ and $\text{Smooth}_{L1}$, and the default value of $\lambda_2$ is 0.5.

In this application, a first part of the model training part is the backbone network, including Focus and SPP modules, and these modules are composed of the convolution layers and pooling layers. After the picture is input into the backbone network, the main features in the picture are extracted through a series of convolution layers and pooling layers, and then the features in these different layers are input into the feature pyramid for feature fusion, so as to enrich the information in the features and enhance the detection ability of the model. Finally, these features are transmitted to the detection to predict the fish objects. There are three convolution layers in the detection, and the fish objects in the picture are predicted on three different scales: 20×20, 40×40 and 80×80, respectively, so as to better detect objects of different sizes in the picture.

The feature matrix in the model training part contains fish individual contour information extracted from the picture; specifically, the information is: the position coordinates of all detected fish in the picture and a probability that they are considered fish. The information of each fish is represented by five numerical values [conf, x, y, w, h]. When the fish is detected, the position of the fish is represented by a rectangular box surrounding the individual fish. This matrix box is the prediction box, and the probability that the object in the prediction box is a fish is represented by conf. The predicted fish position coordinates are the x and y coordinates of a center point of the prediction box in the picture, and the width w and the height h of the prediction box relative to the picture. How many fish are detected in the picture, the information of how many prediction boxes is output. Assuming that N fish are detected in the picture, the data matrix contains the information of N prediction boxes. A dimension of the data matrix is [N,5]. The number of fish may be obtained by calculating how many prediction boxes there are.

To sum up, introducing the improved exclusion loss function into the YOLOv5 loss function to solve the problem of dense occlusion of the fish is helpful to improve the detection accuracy of mutual occlusion caused by high density of the fish. The fish position in the picture may be directly detected by detecting the fish in the picture. Compared with the previous fish detection method, the application greatly improves the detection accuracy under the condition of dense occlusion of the fish, and greatly reduces the number of fish missed detection. The model trained by this algorithm may be deployed to an embedded device with a camera to detect the fish in real time.

DETAILED DESCRIPTION OF THE EMBODIMENTS

Following embodiments, with reference to drawings, are only for an objective of illustrating technical solutions recorded in claims, and are not intended to limit a scope of protection of the claims.

Figure 1:
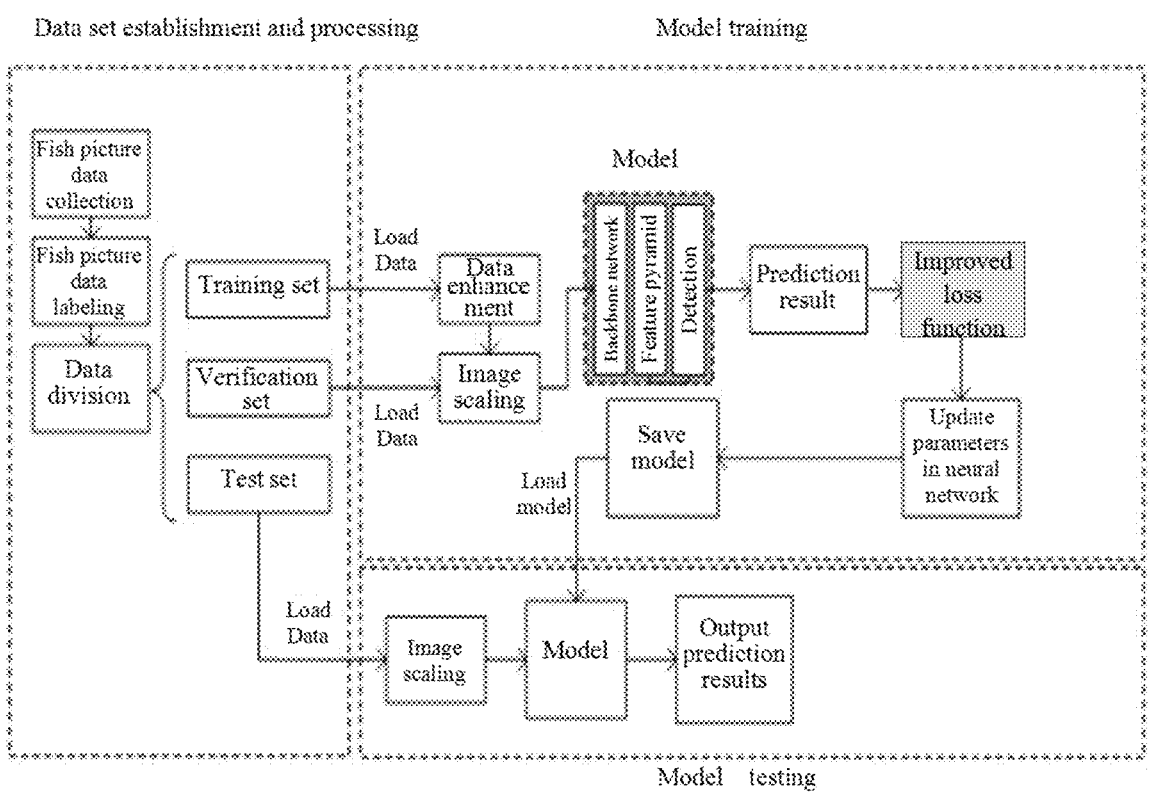
FIG. 1 is a schematic diagram of a system structure of a method for detecting densely occluded fish based on a YOLOv5 network.
Figure 2:
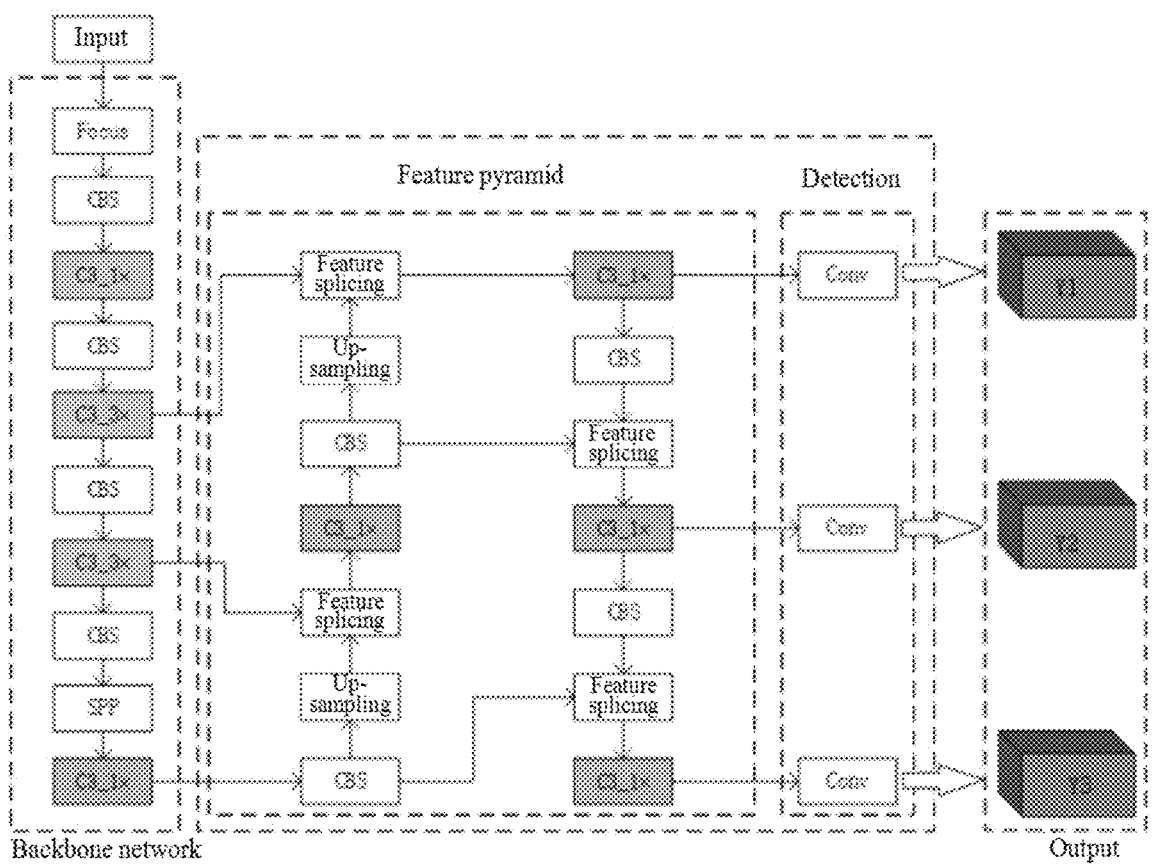
FIG. 2 is a schematic diagram of a neural network model structure.

With reference to FIG. 1 and FIG. 2, a method for detecting densely occluded fish based on a YOLOv5 network includes a data set establishment and processing part, a model training part and a model testing part;

the data set establishment and processing part includes data collection of fish pictures, data labeling and data division of the fish pictures; and the data division is to divide data into a training set, a verification set and a test set;

the model training part includes data enhancement, image scaling, a model, a YOLOv5 loss function for error calculation, model parameter update and model preservation;

the model testing part loads the test set data, processes the data in the loaded and saved model after image scaling, outputs test results, and compares the test results with pictures labeled by LabelImg to determine an effect of model detection.

With reference to FIG. 1, a specific operation is as follows:

1, firstly, a data set making and processing module:

1) data collection: when the fish picture data is collected, the fish in the pictures may be dense and large in number, and there are many mutual occlusions among the fish;

2) data labeling after data collection: the collected fish pictures are labeled with the labeling tool LabelImg, and coordinates of the fish are marked in the pictures; labeled bounding boxes should fit fish objects in the pictures as much as possible during the labeling; the fish labeling boxes are saved in a form of upper left corner coordinates and lower right corner coordinates of the fish labeling boxes; the labeled data set is converted into a format of COCO data set, the form of each labeling box in COCO data set is the coordinates of each center point of each labeling box and a width and a height of each labeling box; the coordinates of each center point and the width and height of each labeling box are divided by the width and height of each picture, a range of coordinate values is limited to 0-1, and then these coordinate values are saved into a txt text document; and 3) data division: after the data labeling is completed, the pictures are divided into the training set, the verification set and the test set according to a ratio of 8:1:1;

2, next, a model training module; in a process of model training, the model is trained for 300 rounds; the process of each round of training is as follows:

1) first, the data in the training set and the verification set is loaded to train a neural network of YOLOv5: after the data is loaded, data enhancement is performed on the training set; firstly, a number of the pictures in the training set is increased by changing brightness, contrast and saturation of the pictures, and then the pictures in the training set are spliced by using a mosaic algorithm to enrich the data in the training set and achieve an objective of data enhancement;

2) the data of the pictures in the training set and the verification set is scaled, and a scaled size is 640×640; if four pictures selected in the training set are scaled and cropped respectively, a scaled picture size is 0.5 to 1.5 times of an original picture size, and a cropped range is a cropping of ⅒ of a left side or a right side of one picture; and then these four pictures are placed in an order of an upper left corner, an upper right corner, a lower left corner and a lower right corner, and these four pictures are spliced into one picture, and these four pictures are input into the network as one picture for training, and the picture size is scaled to 640×640;

3) first, the picture in the training set is input into the neural network (i.e. into the training part of the model in FIG. 2), the features are extracted through the backbone network in the model, and the extracted features are transported to a feature pyramid for feature fusion; then, the fused features are transported to a detection module; in the detection module, the input picture is predicted on three different scales preset manually in advance: 20×20, 4033 40 and 80×80, and three anchor boxes with different sizes are preset on each feature map of each scale, so as to better detect objects with different sizes and shapes in the picture; after the detection, prediction results on three different scales are output; the prediction results include a category, a confidence and the coordinates of a target in the picture, and the prediction results of the model may be obtained;

4) a loss on the training set, a prediction error, is calculated by using an improved loss function after the prediction results of the first round of training are obtained; when fish objects are densely occluded, obtained prediction boxes among different fish objects have a high coincidence degree and a high error value; the neural network is continuously optimized in the following training by using an improved repulsion loss function, so that the prediction boxes among different fish objects are far away from each other, and a coincidence degree among the prediction boxes is reduced, and the error value is continuously reduced;

5) parameters in the neural network are iteratively updated by using a back propagation algorithm;

6) the pictures in the verification set are input into the neural network model to extract the features, the prediction results on the verification set are obtained by using the above steps 2)-5), and the error between the prediction results and real results is calculated, and a prediction accuracy is further calculated; and 7) if the current training is the first round, the model of the current training is saved; if the current training is not the first round, whether the accuracy on the verification set in the current training process is higher than that calculated on the verification set in the last round of training is compared; if the accuracy is high, the model trained in the current training process is saved; otherwise, the next round of training is entered; and the above process is one round of training, and this process may be repeated 300 times according to setting; and 3, finally, a model testing module:

1) the pictures in the test set are loaded and the picture size is scaled to 640×640;

2) the model saved in the training process is loaded, and the model has the highest accuracy on the verification set;

3) the pictures in the test set are input into the loaded model, and the prediction results are obtained; and 4) filtered prediction bounding boxes are visualized, and the prediction accuracy and a calculation speed are calculated to test a generalization performance of the model.

With reference to FIG. 2, the training of the model is explained as follows:

the size of an RGB color picture is set as: w*h*c, where w represents the width of the picture, h represents the height of the picture, and c represents a number of channels of the picture, and the number is usually equal to 3; one picture may be represented as a matrix of w*h*3, and a two-dimensional matrix on each channel is denoted as matrix X:

$$X = \begin{bmatrix} x_{11} & \cdots & x_{1w} \\ \vdots & \ddots & \vdots \\ x_{h1} & \cdots & x_{hw} \end{bmatrix}.$$

The image is input into the network, a convolution operation is performed by means of convolution kernels, and the features are extracted. Among them, the size of each convolution kernel is denoted as f*f, a step size is denoted as s, and an edge size of the image is denoted as p. Generally, if the image is not filled, p is equal to 0. The two-filled dimensional matrix of a convolution layer is denoted as W, and the value in W is obtained by random initialization, with the range of [0, 1]. Then, a calculation process represents Y=W⊗X, where Y represents a calculation result, ⊗ represents the convolution operation between matrix W and matrix X. The calculation process is as follows:

$$Y(i, j) = \Sigma_{m=0} \Sigma_{n=0} W(m, n) * X(i-m, j-n),$$

formulas for calculating the length and the width of Y are:

$$w' = \left\lfloor \frac{w + 2p - f}{s} \right\rfloor + 1,$$

$$h' = \left\lfloor \frac{h + 2p - f}{s} \right\rfloor + 1.$$

The calculation process of the image matrix X in the network is as follows:

the calculation process in the backbone network:

1) the matrix is input into the network, and first scaled to a matrix of 640*640*3, and each two-dimensional matrix in each channel is:

$$X = \begin{bmatrix} x_{11} & \cdots & x_{(1,640)} \\ \vdots & \ddots & \vdots \\ x_{(640,1)} & \cdots & x_{(640,640)} \end{bmatrix},$$

and this matrix is the input matrix.

2) X is input into a Focus module, and the matrix is sliced. The matrix of 640*640*3 is converted into the matrix of 320*320*12; the width and the height of the image become ½ of the original, while the number of channels becomes 4 times, and the matrix on each channel is denoted as X1. Focus module: in YOLOv5, the picture is sliced before the picture enters the backbone. The specific operation is to get a value every other pixel in one picture, and the operation is similar to adjacent down-sampling; in this way, four pictures are obtained, and the four pictures are complementary and have no information loss. In this way, the information of W and H is concentrated in a channel space, and the input channels are expanded by 4 times, and the spliced picture is changed into 12 channels compared with an original RGB three-channel mode; and finally the obtained new picture is convolved, and a double down-sampling feature map without information loss is finally obtained.

$$X1 = \begin{bmatrix} x_{11} & \cdots & x_{(1,320)} \\ \vdots & \ddots & \vdots \\ x_{(320,1)} & \cdots & x_{(320,320)} \end{bmatrix},$$

then, the sliced matrix is input into the convolution layer for the convolution operation. This convolution layer contains 32 convolution kernels with the size of 3*3*12, and each convolution kernel may be represented as a matrix with a dimension of 3*3*12, and the 3*3 matrix on each channel of each convolution kernel is denoted as W1. A convolution process may be expressed as the operation of X1 and W1, and is denoted as:

$$X2 = X1 \otimes W1,$$

where matrix X2 is the output matrix of the Focus module.

3) The matrix X2 is input into a CBS module, and the convolution operation is performed on X2; and the size of the convolution kernel is 3*3, the step size is 2 and is represented as matrix W2 of 3*3, and the operation process is recorded as:

$$X3=X2\otimes W2,$$

where the matrix X3 is the output.

4) The matrix X3 is input into a C3_1x module, and the module consists of five CBS modules; the convolution kernel size is 1*1, the step size is 1, and convolution kernel matrices are recorded as $W_3^1$, $W_3^2$, $W_3^3$, $W_3^4$ and $W_3^5$, and the input matrix is operated with five convolution kernels, and the operation process is as follows:

$$X4=(X3\otimes W_3, X3\otimes W_3^2+X3\otimes W_3^2\otimes W_3^3 237\ W_3^4)\otimes W_3^5,$$

where the matrix X4 is the output result of this module.

5) The matrix X4 is input into the CBS module. In this module, the convolution kernel size is 3*3, the step size is 2, and the convolution kernel matrix is denoted as W5. The operation process of X4 and W5 is denoted as:

$$X5=X4\otimes W5,$$

where matrix X5 is the output result of this module.

6) The matrix X5 is input into a C3_3x module. There are 9 convolution layers in this module, and the convolution layers contain 9 convolution kernels with the size of 1*1 or 3*3, and the convolution kernels are represented as $W_6^1$, $W_6^2$, $W_6^3$, ..., $W_6^9$. Matrix X7 is operated with the 9 convolution kernel matrices in turn. The operation process is as follows:

$$X_6^1=X5\otimes W_6^1,$$

$$X_6^2=X5\otimes X_6^2,$$

$$X_6^3=X_6^2+X_6^2\otimes W_6^3\otimes W_6^4,$$

$$X_6^4=X_6^3+X_6^3\otimes W_6^5\otimes W_6^6,$$

$$X_6^5=X_6^4 X_6^4\otimes W_6^7\otimes W_6^8.$$

Matrices $X_6^1$ and $W_6^5$ are spliced and merged into one matrix, and the matrix is record as $X6=X_6^6\otimes W_6^9$. Then, the convolution operation is performed on the matrices $X_6^6$ and $W_6^9$, and is recorded as:

$$X6=X_6^6\otimes W_6^9,$$

where matrix X6 is the output result of this module, and is denoted as feature A1.

7) The matrix X6 is input into the CBS module, where the convolution kernel size is 3*3 and the step size is 2. If the two-dimensional matrix of this convolution kernel is expressed as W7, the operation process is recorded as:

$$X7=X6\otimes W7.$$

8) The matrix W7 is input into the second C3_3x module. There are 9 convolution layers in this module, and the convolution layers contain 9 convolution kernels with the size of 1*1 or 3*3, and the convolution kernels are represented as $W_8^1$, $W_8^2$, $W_8^3$, $W_8^4$, $W_8^5$, $W_8^6$, $W_8^6$, $W_8^7$, $W_8^8$ and $W_8^9$. Matrix X7 is operated with the 9 convolution kernel matrices in turn. The operation process is as follows:

$$X_8^1=X7\otimes W_8^1,$$

$$X_8^2=X7\otimes W_8^2,$$

$$X_8^3=X_8^2=X_8^2\otimes W_8^3\otimes W_8^4,$$

$$X_8^4=X_8^3=X_8^3\otimes W_8^5\otimes W_8^6,$$

$$X_8^5=X_8^4+X_8^4\otimes W_8^7\otimes W_8^8.$$

The matrices $X_8^1$ and $X_8^5$ are spliced and merged into one matrix, and the matrix is denoted as $X_8^6=$. Then, the convolution operation is performed on the matrices $X_8^6$ and $W_8^9$, and is recorded as:

$$X8=X_8^6\otimes W_8^9,$$

where the matrix X8 is the output result of this module, and is denoted as feature A2.

9) The matrix X8 is input into the CBS module, where the convolution kernel size is 3*3 and the step size is 2. The two-dimensional matrix of the convolution kernel is expressed as W9, and the operation process is recorded as:

$$X9=X8\otimes W9,$$

where the X9 matrix is the output result of this module.

10) The matrix X9 is input into a SPP module. In the SPP module, the matrix X9 is first calculated by using a convolution layer; in this convolution layer, the convolution kernel size is 1*1, p=1, and the convolution kernel matrix is denoted as $W_{10}^1$. The operation process is expressed as follows:

$$X_{10}^1=X9\otimes W_{10}^1;$$

then, the matrix $X_{10}^1$ is input into maximum pooling layers of 5*5, 9*9 and 13*13, respectively, the matrices $X_{10}^2$, $X_{10}^3$, and $X_{10}^4$ are obtained, and these three matrices are combined with $X_{10}^1$ in a channel dimension to obtain the matrix $X_{10}^5=$; then, the matrix $X_{10}^5$ is input into the convolution layer with the convolution kernel size of 1*1, and the convolution kernel matrix is denoted as $W_{10}^2$. The operation process is as follows:

$$X10=X_{10}^5\otimes W_{10}^2.$$

where X10 is the output result of this module.

11) The matrix X10 is input into the last C3_1x module in the backbone network, and the module contains five convolution kernels. The convolution matrices are respectively expressed as $W_{11}^1$, $W_{11}^2$, $W_{11}^3$, $W_{11}^4$, $W_{11}^5$, and the operation process is as follows:

$$X11=(X10\otimes W_{11}^1, X10\otimes W_{11}^2\otimes W_{11}^3\otimes W_{11}^4)\otimes W_{11}^5,$$

where X11 is the output result of this module, and is denoted as feature A3, and is also the final output matrix of the backbone network, and is input into the feature pyramid with the matrices X6 and X8 respectively.

The calculation process in the feature pyramid is as follows:

12) the matrix X11 is input into the CBS module, in which the convolution kernel size is 1*1, the step size is 1, and the convolution kernel matrix is denoted as W12. The operation process is as follows:

$$X12=X11\otimes W12,$$

where X12 is the output of this module, and is denoted as feature matrix B1.

13) The matrix X12 and X8 are spliced, and the spliced matrix is recorded as $X_{12}^1$,(X12,X8); the spliced matrix is input into the C3_1x module, and the module contains five convolution kernels; the convolution kernel matrices are respectively represented as $W_{13}^1$, $W_{13}^2$, ..., $W_{13}^5$, and the operation process is:

$$X13=(X_{12}^1\otimes W_{13}^1, X_{12}^1\otimes W_{13}^2\otimes W_{13}^3\otimes W_{13}^4)\otimes\ W_{13}^5,$$

where X13 is the output of this module.

14) The matrix X13 is input into the CBS module, in which the convolution kernel size is 1*1, the step size is 1, and the convolution kernel matrix is denoted as W14. The operation process is as follows:

$$X14 = X13 \otimes W14,$$

where X14 is the output of this module, and is denoted as feature matrix B2.

15) The matrix X14 and X6 are spliced, and the spliced matrix is denoted as $X_{14}^1 = (X14, X6)$. The matrix $X_{14}^1$ is input into the second C3_1x module of the feature pyramid, and the module contains five convolution kernels. The convolution kernel matrices are expressed as: $W_{15}^1, W_{15}^2, \ldots, W_{15}^5$, and the operation process is:

$$X15 = (X_{14}^1 \otimes W_{15}^1, X_{14}^1 \otimes W_{15}^2 \otimes W_{15}^3 \otimes W_{15}^4) \otimes W_{15}^5,$$

where matrix X15 is the output of this module, and is denoted as feature matrix B3.

16) The matrix X15 is input into the CBS module. In this module, the convolution kernel size is 1*1, the step size is 1, and the convolution kernel matrix is W16. The operation process is:

$$X16 = X15 \otimes X16,$$

where X16 is the output of this module.

17) The matrix X16 and the matrix X14 are spliced, and the spliced matrix is denoted as $X_{16}^1 = (X16, X14)$; the matrix $X_{16}^1$ is input into the third C3_1x of the feature pyramid; this module contains five convolution kernels, and the convolution kernel matrices are expressed as: $W_{17}^1, W_{17}^2, \ldots, W_{17}^5$, and the operation process is:

$$X17 = (X_{16}^1 \otimes W_{17}^1, X_{16}^1 \otimes W_{17}^2 \otimes W_{17}^3 \otimes W_{17}^4) \otimes W_{17}^5,$$

where matrix X17 is the output of this module, and is denoted as feature matrix B4.

18) The matrix X17 is input into the CBS module. In this module, the convolution kernel size is 1*1, the step size is 1, and the convolution kernel matrix is W18. The operation process is as follows:

$$X18 = X17 \otimes W18,$$

where X18 is the output of this module.

19) The matrix X18 and X12 are spliced, and the spliced matrix is denoted as $X_{18}^1 = (X18, X12)$; the matrix $X_{18}^1$ is input into the forth C3_1x of the feature pyramid; this module contains five convolution kernels, and the convolution kernel matrices are expressed as: $W_{19}^1, W_{19}^2, \ldots, W_{19}^5$, and the operation process is:

$$X19 = (X_{18}^1 \otimes W_{19}^1, X_{18}^1 \otimes W_{19}^2 \otimes W_{19}^3 \otimes W_{19}^4) \otimes W_{19}^5,$$

where matrix X19 is the output of this module, and is denoted as feature matrix B5.

20) The three matrices X15, X17 and X19 are input into the detection module; the detection module contains three convolution layers, the convolution kernel size in each convolution layer is 1*1, the step size is 1, and the three convolution kernel matrices are respectively recorded as $W_{20}^1, W_{20}^1$ and $W_{20}^3$. The operation process is:

$$X_{20}^1 = X15 \otimes W_{20}^1,$$

$$X_{20}^2 = X17 \otimes W_{20}^1,$$

$$X_{20}^3 = X19 \otimes W_{20}^3.$$

Matrices $X_{20}^1, X_{20}^2$ and $X_{20}^3$ are the final prediction results; the dimension of each matrix is m*6, indicating that there are m targets predicted in the picture, including 6 pieces of predicted information: (conf, x, y, w, h, cls), which respectively indicate a scoring probability of the target, a center position X of the target, a center position Y, the width of the target, the height of the target and the category of the target (i.e. whether the target is fish or not).

The matrices $X_{20}^1, X_{20}^2$ and $X_{20}^3$ are used as the input of the loss function $L_{RepGT}$, and compared with a real value; a prediction error is calculated, and then the network is continuously optimized.

The matrices $X_{20}^1, X_{20}^2$ and $X_{20}^3$ are respectively input into the formula as input variables X:

$$L_{RepGT}(X) = \frac{\lambda_1 * \sum_{P \in \mathcal{P}_+} \text{Smooth}_{ln} IoG(X, G_{Rep}^P) + \lambda_2 * \sum_{P \in \mathcal{P}_+} \text{Smooth}_{L1} IoG(X, G_{Rep}^P)}{|\mathcal{P}_+|},$$

where $\lambda_1$ and $\lambda_2$ are weight values of each function; proportions of two functions Smooths and $\text{Smooth}_{L1}$ are adjusted by introducing two weight parameters $\lambda_1$ and $\lambda_2$, and default values of $\lambda_1$ and $\lambda_2$ are 0.5; $\mathcal{P}+=\{P\}$ represents the set of all positive samples in one picture; $B^P$ represents the prediction box, and $G_{Rep}^P$ represents the prediction box $B^P$ and truth boxes of other targets that have the greatest intersection over union with $B^P$ except the truth box corresponding to $B^P$.

Among them, $$G_{Rep}^P = \underset{G \in \mathcal{G}\{G_{Attr}^P\}}{\arg\max} IoU(G, P),$$

where $G_{Attr}^P = \arg\max_{G \in \mathcal{G}} IoU(G, P)$, $\mathcal{G} = \{G\}$ represents the set of all the truth boxes in one picture; expressions of $\text{Smooth}_{ln}(\ ), \text{Smooth}_{L1}(\ )$ and $IoG(\ )$ are as follows, where $\sigma \in [0, 1]$;

$$\text{Smooth}_{ln}(x) = \begin{cases} -\ln(1-x) & x \leq \sigma \\ \frac{x-\sigma}{1-\sigma} - \ln(1-\sigma) & x > \sigma \end{cases},$$

$$\text{Smooth}_{L1}(x) = \begin{cases} 0.5x^2, & |x| < 1 \\ |x| - 0.5, & \text{Other} \end{cases}, \text{ and}$$

$$IoG(B^P, G_{Rep}^P) \triangleq \frac{\text{area}(B^P \cap G_{Rep}^P)}{\text{area}(G_{Rep}^P)}.$$

Then, Y1, Y2 and Y3 are output values and calculated error values. The final error is a sum of Y1, Y2 and Y3:

$$Y = Y1 + Y2 + Y3;$$

after the training process is completed once, the pictures in the verification set are scaled to 640*640 and then input into the trained neural network, and the prediction accuracy of the model is calculated;

this process is iterated for 300 times, and the model with the highest prediction accuracy on the validation set is saved during the iteration; and the pictures in the test set are scaled to 640*640, and then the model saved in the training process before is load; the pictures in the test set are input into the model, the prediction bounding boxes are output and further processed by a non-maximum suppression algorithm; the bounding boxes with high coincidence degree are filtered out, and then the filtered prediction bounding boxes are visualized in the pictures, and the prediction accuracy and the calculation speed are calculated to test the generalization performance of the model.

After all the pictures in the training set are iterated for one round, the pictures in the verification set are input into the model, and the prediction bounding boxes of fish targets in the pictures are output. After that, the non-maximum suppression algorithm is further run on the prediction bounding boxes in the pictures to remove the repeated bounding boxes and keep more accurate prediction bounding boxes. The training process is repeated until the model converges, and the model with the highest accuracy is saved on the verification set in the training process.

Figure 3:
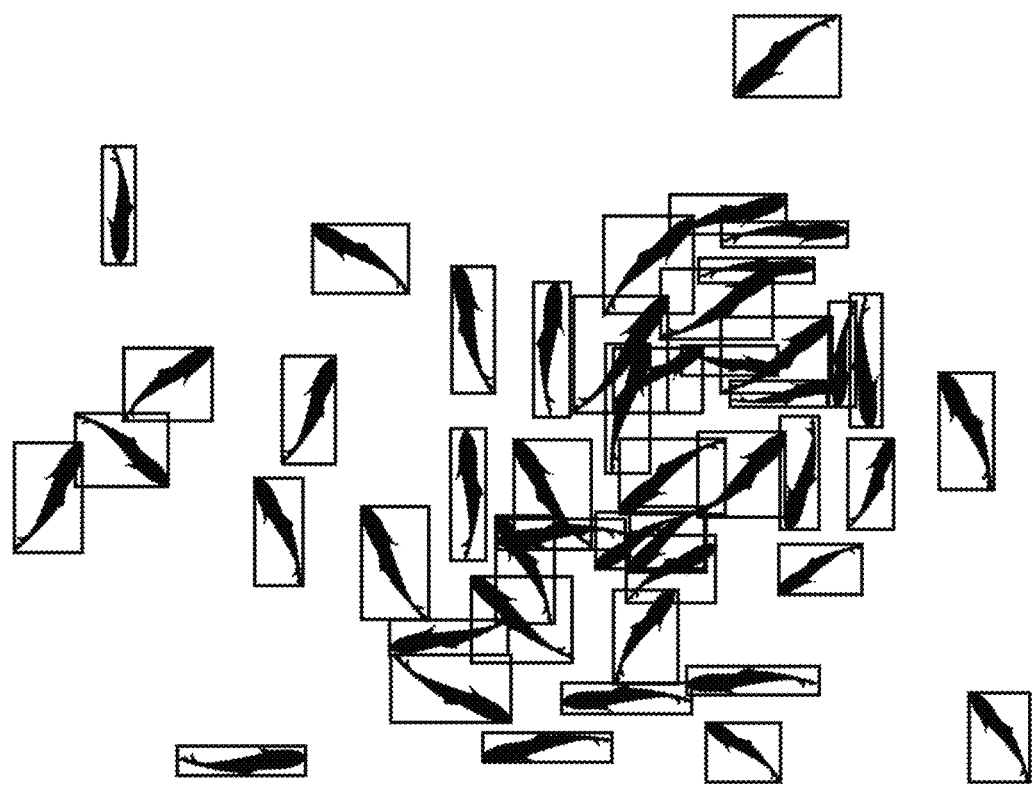
FIG. 3 is a detection effect diagram of fish by using a method according to the present application.

As shown in detection effect diagrams of FIG. 3, in the method for detecting the densely occluded fish based on the YOLOv5 network according to the application, the improved exclusion loss function is introduced into the YOLOv5 algorithm to solve the problem of dense occlusion of the fish and improve the detection accuracy when the fish are densely occluded; and the fish positions in the pictures may be directly detected by detecting the fish in the pictures.

into one picture, and these four pictures are input into the network as one picture for training, and the picture size is scaled to 640×640;

the data division is to divide the pictures into the training set, the verification set and the test set according to a ratio of 8:1:1 after the data labeling is completed;

in the model training part, a model training budget result output by the model is calculated by using a loss function, an error of the training budget result is obtained, and parameters in the neural network of the model are updated to improve an accuracy of the model; the loss function is an improved loss function, and an improved repulsion loss function is introduced into the loss function to enhance an ability of the model to detect mutually occluded fish;

the improved repulsion loss function is $L_{RepGT}$, and $Smooth_{ln}$ and $Smooth_{L1}$ functions used in the $L_{RepGT}$ function make prediction boxes of different fishes repel each other, so as to achieve an effect of being far away from each other and reduce an overlap degree between the prediction boxes, thereby reducing a number of fish missed detection and improving a detection accuracy;

the improved repulsion loss function is as follows:

$$L_{RepGT} = \frac{\lambda_1 * \sum_{P \in \mathcal{P}_+} \mathrm{Smooth}_{ln} IoG(B^P, G^P_{Rep}) + \lambda_2 * \sum_{P \in \mathcal{P}_+} \mathrm{Smooth}_{L1} IoG(B^P, G^P_{Rep})}{|\mathcal{P}_+|},$$

Compared with the previous fish detection method, the application greatly improves the detection accuracy under a condition of dense occlusion of the fish, and greatly reduces the number of fish missed detection, thus laying a technical foundation for future fish counting measurement. The model trained by this algorithm may be deployed to an embedded device with a camera for real-time detection of dense fish. The number of fish in the pictures may also be obtained by counting the number of bounding boxes.

The above is only a preferred embodiment of the application, and is not intended to limit the application. Any modification, equivalent substitution, improvement, etc. made within a spirit and a principle of the application should be included in the scope of protection of the application.

What is claimed is:

1. A method for detecting densely occluded fish based on a You Only Look Once 5 (YOLOv5) network, comprising a data set establishment and processing part, a model training part and a model testing part, wherein the data set establishment and processing part comprises data collection of fish pictures, data labeling and data division of the fish pictures, and the data division is to divide data into a training set, a verification set and a test set, wherein the data in the training set is expanded by changing brightness, contrast and saturation of the fish pictures, and then the data is input into a neural network model used by the YOLOv5 network for training; when the model is trained, a mosaic method is used as an algorithm to enhance the data; four pictures selected in the training set are scaled and cropped respectively, and a scaled picture size is 0.5 to 1.5 times of an original picture size, and a cropped range is a cropping of ⅒ of a left side or a right side of one picture; and then these four pictures are placed in an order of an upper left corner, an upper right corner, a lower left corner and a lower right corner, and these four pictures are spliced wherein $\lambda_1$ and $\lambda_2$ are weight values of each function, and $\mathcal{P}_+ = \{P\}$ represents a set of all positive samples in one picture; $B^P$ represents the prediction box, $G_{Rephu\ P}$ represents the prediction box $B^P$ and truth boxes of other targets that have the greatest intersection over union with $B^P$ except the truth box corresponding to $B^P$;

the $G_{Rep}^P$, $$G_{Rep}^P = \underset{G \in \mathcal{G}\{G_{Attr}^P\}}{\arg\max}\ IoU(G, P),$$

wherein $G_{Attr}^P = \arg\max_{G \in} \mathcal{G} IoU(G,P)$, $\mathcal{G}=\{G\}$ represents a set of all the truth boxes in one picture; expressions of $\mathrm{Smooth}_{ln}()$, $\mathrm{Smooth}_{L1}()$, and $IoG()$ are as follows, and $\sigma \in [0,1]$;

$$\mathrm{Smooth}_{ln}(x) = \begin{cases} -\ln(1-x) & x \le \sigma \\ \dfrac{x-\sigma}{1-\sigma} - \ln(1-\sigma) & x > \sigma \end{cases},$$

$$\mathrm{Smooth}_{L1}(x) = \begin{cases} 0.5x^2, & |x| < 1 \\ |x| - 0.5, & \text{Other} \end{cases}, \text{ and}$$

$$IoG(B^P, G_{Rep}^P) \triangleq \frac{\mathrm{area}(B^P \cap G_{Rep}^P)}{\mathrm{area}(G_{Rep}^P)};$$

the picture in the training set is input into the neural network model, the features are extracted through a backbone network in the model, and the extracted features are transported to a feature pyramid for a feature fusion; then, the fused features are transported to a detection module; after a detection, prediction results on three different scales are output; and the prediction results comprise a category, a confidence and the coordinates of a target in the picture, and the prediction results of the model are obtained;

a loss on the training set, namely a prediction error, is calculated by using an improved loss function after the prediction results of a first round of training are obtained;

when fish objects are densely occluded, obtained prediction boxes among different fish objects have a high coincidence degree and a high error value; the neural network is continuously optimized in a following training by using an improved repulsion loss function, so the prediction boxes among different fish objects are far away from each other, and the coincidence degree among the prediction boxes is reduced, and the error value is continuously reduced;

the parameters in the neural network are iteratively updated by using a back propagation algorithm;

the pictures in the verification set are input into the neural network model to extract the features, the prediction results on the verification set are obtained, and an error between the prediction results and real results is calculated, and a prediction accuracy is further calculated;

if a current training is a first round, the model of the current training is saved; if the current training is not the first round, whether the accuracy on the verification set in a current training process is higher than that calculated on the verification set in a last round of training is compared; if the accuracy is high, the model trained in the current training process is saved; otherwise, a next round of training is entered; and the above process is one round of training, and this process is repeated 300 times according to setting; and finally, a model testing module is as follows:

1) the pictures in the test set are loaded and the picture size is scaled to 640×640;
2) the model saved in the training process is loaded, and the model has the highest accuracy on the verification set;
3) the pictures in the test set are input into the loaded model, and the prediction results are obtained; and
4) filtered prediction bounding boxes are visualized, and the prediction accuracy and a calculation speed are calculated to test a generalization performance of the model.

2. The method for detecting the densely occluded fish based on the YOLOv5 network according to claim 1, wherein the model training part is to obtain the prediction results after a data enhancement, image scaling and modeling of image data, to calculate the loss of the prediction results by the loss function, and to update the parameters in the neural network; and the model comprises the backbone network, the feature pyramid and the detection;

picture data is input into the backbone network of the model:

1) firstly, the data is input, and the features in the picture are preliminarily extracted after the data sequentially passes through a Focus module, a C3_1x module, a CBS module and a C3_3x module, and a feature matrix extracted at this time is saved and recorded as feature A1;
2) the feature A1 continues to be transmitted downwards, sequentially passes through the CBS module and C3_3x module to further extract the features, and a feature matrix extracted at this time is saved and recorded as feature A2; and
3) the feature A2 continues to be transmitted downwards, sequentially passes through the CBS module, a SPP module and the C3_3x module to extract the features, and a feature matrix extracted at this time is saved and recorded as feature A3.

3. The method for detecting the densely occluded fish based on the YOLOv5 network according to claim 2, wherein the features A1, A2 and A3 are all input into the feature pyramid, and in the feature pyramid, 1) firstly, the feature A3 is input into the CBS module to further extract the features, and an extracted feature matrix is saved and denoted as feature B1;
2) after the feature B1 is up-sampled, the feature B1 is input into a splicing module together with the previously stored feature A2 to be merged into one feature matrix, and then the merged feature matrix is sequentially input into the C3_1x module and the CBS module to further extract the features, and an extracted feature matrix is saved and recorded as feature B2;
3) the feature B2 is input into an up-sampling module for an up-sampling operation, and then is input into the splicing module together with the previously stored feature A1 to be merged into one feature matrix, and then the merged feature matrix is input into the C3_1x module to further extract the features, and an extracted feature matrix is saved and recorded as feature B3;
4) after the feature B3 is continuously input into the CBS module for feature extraction, the feature B3 is transported to the splicing module together with the previously stored feature B2 to be merged into one feature matrix, and then the merged feature matrix is input into the C3_1x module for further feature extraction, and an output feature matrix is saved and recorded as feature B4; and
5) after the feature B4 continues to flow through the CBS module, the feature B4 is input into the splicing module together with the previously stored feature matrix B1 to be merged into one feature matrix, and then the merged feature matrix is input into the C3_1x module for the further feature extraction, and an output feature matrix is saved and recorded as feature B5.

4. The method for detecting the densely occluded fish based on the YOLOv5 network according to claim 3, wherein the extracted feature matrices B3, B4 and B5 are respectively input into three Cony layers of a detection module to identify and detect positions of fish objects in the picture, and a final prediction result is output in a form of data matrix.

5. The method for detecting the densely occluded fish based on the YOLOv5 network according to claim 1, wherein the picture data in the data set establishment and processing part is obtained by following ways: collecting the fish pictures under mutual occlusion, and then manually labeling the data set with the Labellmg labeling tool, and converting the labeled data set into a COCO data set format; saving fish labeling boxes in a form of upper left corner coordinates and lower right corner coordinates of the fish labeling boxes after labeling the pictures by the Labellmg, wherein the form of each labeling box in the COCO data set is coordinates of each center point of each labeling box and a width and a height of each labeling box; dividing the coordinates of each center point and the width and the height of each labeling box by the width and the height of each picture, limiting a range of coordinate values to 0-1, and then saving these coordinate values into a txt text document.

6. The method for detecting the densely occluded fish based on the YOLOv5 network according to claim 1, wherein in the detection, the input picture is predicted by the algorithm on three different scales preset manually in advance: 20×20, 40×40 and 80×80, and three anchor boxes with different sizes are preset on each feature map of each scale to better detect objects with different sizes and shapes in the picture; and prediction results on three different scales are output after the detection; and the prediction results comprise the category, the confidence and the coordinates of the target in the picture.

* * * * *